United States Patent
Dennis (10) Patent No.: US 6,904,943 B2
(45) Date of Patent: Jun. 14, 2005

(54) ARTICULATED FUEL CONTAINER VENT SYSTEM AND METHOD

(75) Inventor: Scott Dennis, Powell, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/401,780

(22) Filed: Mar. 31, 2003

(65) Prior Publication Data

US 2004/0187956 A1 Sep. 30, 2004

(51) Int. Cl.⁷ .............................. B65B 31/04
(52) U.S. Cl. ..................... 141/1; 141/59; 141/95; 141/290; 137/43; 137/45
(58) Field of Search ............... 141/7, 59, 95, 141/290, 303; 137/38, 43, 45, 587, 616.7; 251/344, 345; 180/282

(56) References Cited

U.S. PATENT DOCUMENTS

| | | | |
|---|---|---|---|
| 1,852,558 A | * | 4/1932 | Dunzweiler ............... 429/85 |
| 2,324,999 A | * | 7/1943 | Shinn ..................... 220/202 |
| 2,433,405 A | * | 12/1947 | Stamm .................... 137/45 |
| 3,672,537 A | | 6/1972 | Kitzner |
| 3,968,896 A | | 7/1976 | Giacoletti et al. |
| 4,275,753 A | * | 6/1981 | Williams .................. 137/45 |
| 4,444,230 A | | 4/1984 | Van Mullem |
| 4,966,299 A | | 10/1990 | Teets et al. |
| 5,052,437 A | | 10/1991 | Danna |
| 5,152,315 A | | 10/1992 | Lagache |
| 5,381,838 A | | 1/1995 | Watanabe et al. |
| 5,809,976 A | * | 9/1998 | Cook et al. ............... 123/516 |
| 5,950,659 A | | 9/1999 | Szlaga et al. |
| 6,581,621 B1 | * | 6/2003 | Klaffki et al. ............. 137/43 |

* cited by examiner

Primary Examiner—Justine R. Yu
Assistant Examiner—Peter deVore
(74) Attorney, Agent, or Firm—Sterne, Kessler, Goldstein & Fox P.L.L.C.

(57) ABSTRACT

A vent system associated with a vapor outlet is coupled to a container (e.g., a fuel tank). The vent system can be used for onboard refueling vapor recovery (ORVR) for vehicles. The vent system includes a first elongated member (e.g., a vent tube), a rotating device, and a second elongated member (e.g., a breather tube) that is coupled between the rotating device and a buoyant device. The buoyant device interacts with materials (e.g., fuel) input into the fuel tank to actuate rotation of the rotating device. Once a predetermined amount of fuel has been input into the fuel tank, the buoyant device rotates the rotating device a predetermined amount, which stops venting of fuel vapor through the vent system. The fuel level continues to increase up the filler pipe until an automatic shut off mechanism of the device controlling fuel input stops fuel flow. Through the use of the buoyant device and the rotating device, regardless of the incline of the fuel tank with respect to a ground plane, the passage for vapors through the vent system will be closed when the fuel has reached the predetermined level. Thus, the vent system is used to compensate for inclination of the fuel tank.

42 Claims, 11 Drawing Sheets

ARTICULATED FUEL CONTAINER VENT SYSTEM AND METHOD

BACKGROUND OF THE INVENTION

1. Field of the Invention

The present invention is related to a self-adjusting vapor outlet system and method that assists in determining a material shut-off level in a container, such as a vehicle fuel tank.

2. Background Art

When refueling gas in a tank, most systems have an automatic shut-off feature. Basically, near a tip of a nozzle there is a small hole and a small pipe leads back from the hole into a handle of the nozzle. Suction is applied to this pipe using a venturi. When the tank is not full, air is being drawn through the hole by a vacuum, and the air flows easily. When gasoline in the tank rises high enough to block the hole, a mechanical linkage in the handle senses the change in suction and shuts-off the nozzle.

Figure 1:
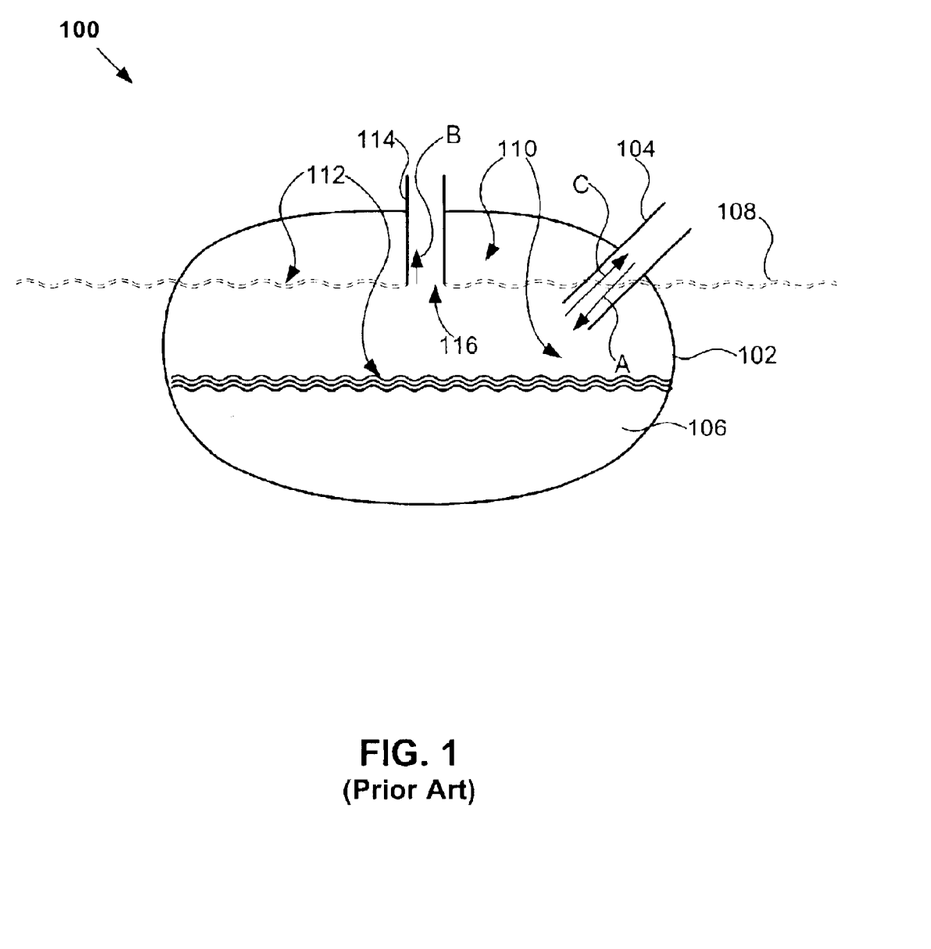
FIG. 1 shows a cross-section of a conventional fuel tank system.

FIG. 1 shows a conventional fuel tank system 100. Filling of a fuel tank 102 is achieved by inserting a pressure-sensitive nozzle (not shown) that is in fluid communication with a fuel filler pipe 104 and a supply of fuel (not shown). Upon insertion of the pressure-sensitive nozzle into a neck of fuel filler pipe 104, fuel 106 is delivered from filler pipe 104 in the direction of arrow A until fuel flow is stopped by an operator or based on fuel 106 in the container reaching a predetermined (e.g., automatic shut-off based on a pressure sensitive nozzle) level 108. During this process, the space 110 in fuel tank 102 above a surface 112 of fuel 106 becomes occupied by fuel vapor. Vapor must be displaced via the fuel tank vent 114 for fuel 106 to enter the fuel tank 102. When vent opening 116 of vent 114 is closed, fuel 106 will fill up filler pipe 104 until reaching the pressure sensitive nozzle (not shown). Once the pressure sensitive nozzle is reached, auto shut-off if instigated.

A fuel shut-off level 108 is reached when the rising surface 112 of fuel 106 in fuel tank 102 is higher than an open end 116 of vent tube 114. Before reaching fuel shut-off level 108, the amount of vapor pressure approximates ambient atmospheric pressure because of unobstructed relief through vent tube 114. Beyond fuel shut-off level 108, if more fuel 106 were delivered into fuel tank 102 from the supply through the pressure-sensitive filler pipe nozzle, the vapor pressure in space 110 above fuel 106 in fuel tank 102 would rise because the fuel vapor has no means of escape through vent tube 114. In response to the build-up of fuel vapor pressure, fuel flows in the direction of arrow C, the pressure-sensitive nozzle terminates the delivery of fuel 106 into fuel tank 102.

Figure 2:
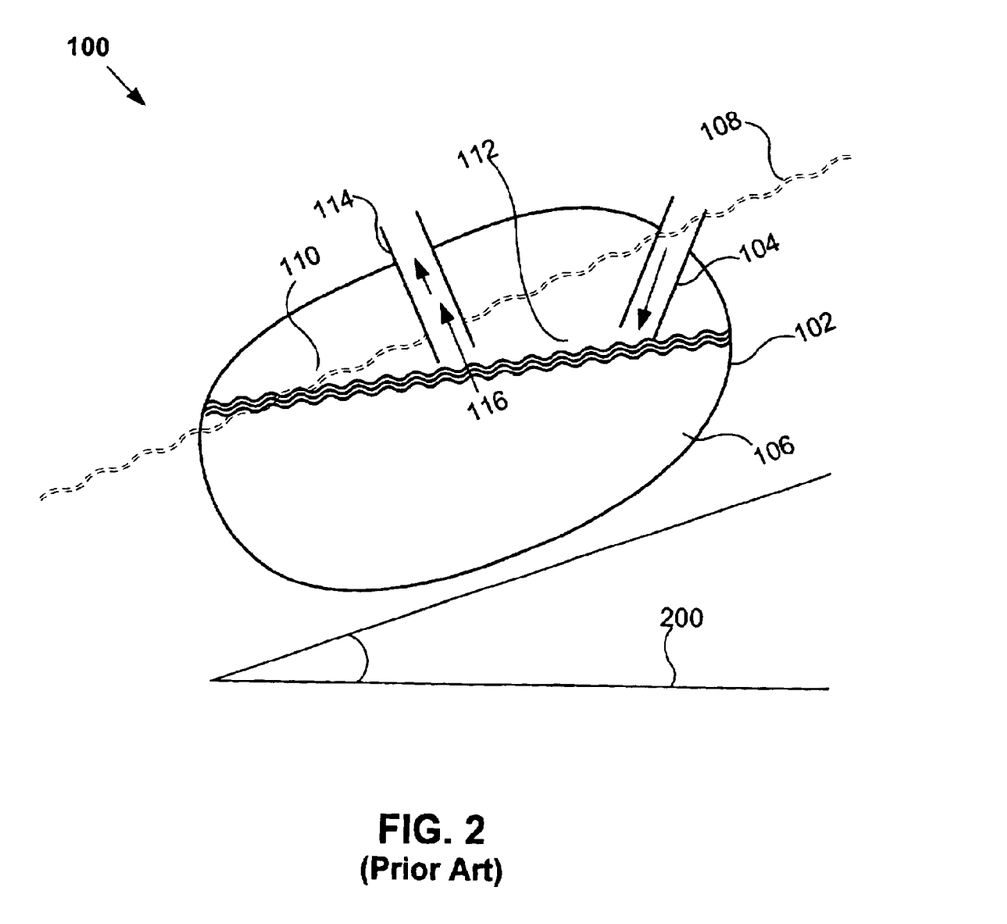
FIG. 2 shows the conventional system in FIG. 1 positioned at an incline with respect to a ground plane.

As seen in FIG. 2, if system 100 is positioned at an incline with respect to a ground surface 200 over a predetermined angle (e.g., a 2° incline is a tolerance established for refueling of automobiles, while sport utility vehicles can have greater incline angles), there can be a substantially reduced chance breather tube 114 will be properly positioned with respect to surface 112. Again, proper positioning is when surface 112 blocks open end 116 of breather tube 114 at the predetermined cutoff level 108. Thus, when breather tube 114 and surface 112 are not properly positioned due to the incline, vapor removal will continue through breather tube 114, until fuel 106 has passed predetermined cutoff level 108. Hence, the vapor escape path is hydraulically closed. The fuel level will increase slightly as it continues up breather tube 114. When this occurs, an auto-shutoff mechanism in the pressure-sensitive nozzle, which is usually triggered by detecting a differential in filling pressure through the filling gun inserted in input tube 104, will actuate. This can cause an early shut-off and/or inadequate filing of fuel tank 102.

Therefore, what is needed is a system associated with a vent tube of a fuel tank that accurately responds to fuel level regardless of an incline of the fuel tank with respect to a ground plane.

BRIEF SUMMARY OF THE INVENTION

An embodiment of the present invention provides a fuel tank system including a container having a filler opening and a vent opening and vent means coupled to the vent opening for venting fuel vapors from the container until a fuel level in the container reaches a predetermined level. The vent means compensates for when the container is inclined with respect to a ground plane. In one instance, the vent means can include a hollow vent tube, a flexible sleeve coupled to the vent tube and having a hollow lumen in communication with the hollow vent tube, a float, and a rotational coupling joining the float to the flexible sleeve. The rotation of the rotational coupling is based on interaction of the float with fuel in the container. The rotation causes bending of the flexible sleeve which, at the predetermined level, closes the lumen to stop the venting of the fuel vapors. In another instance, the system further includes a vent means support device. In this embodiment, the vent means includes a hollow vent tube, a float, and a rotational coupling having an opening communicating with the hollow vent tube. The rotation of the rotational coupling is based on interaction of the float with fuel in the container. The rotation causes the opening to be sealed which, at the predetermined level, closes passage of the fuel vapors through the rotational coupling to stop the venting of the fuel vapors.

Another embodiment of the present invention provides a fuel tank vent system for use with a fuel tank including a vent for allowing escape of fuel vapors and means for preventing escape of fuel vapors through the vent when a fuel level in the fuel tank reaches a predetermined level. The means for preventing escape is also used to compensate for inclinations of the fuel tank with respect to a ground plane. In one instance, the means for preventing escape includes a flexible sleeve coupled to the vent and having a hollow lumen in communication with the vent, a float, and a rotational coupling joining the float to the flexible sleeve. The rotation of the rotational coupling caused by movement of the float causes bending of the flexible sleeve, which closes the lumen when the fuel level reaches said predetermined level. In another instance, the means for preventing escape includes a support structure, a float, and a rotational coupling having an opening. The rotation of the rotational coupling caused by movement of the float causes the opening to close when the fuel level reaches said predetermined level.

A still further embodiment of the present invention provides a method including the steps of inputting material that can emit vapors into a container through a first opening in the container and outputting the vapors through a vent system located in a second opening in the container. The method also includes the steps of actuating rotation of a first section of the vent system when the material interacts with a second section of the vent system and closing a third section of the vent system to stop vapor output after the first section of the vent system has rotated a predetermined amount. The method further includes the step of stopping the inputting step based on the closing step.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Overview

Embodiments of the present invention provide a vent system (e.g., vent means) associated with a vapor outlet that is coupled to a container (e.g., a fuel tank). The vent system can be used for onboard refueling vapor recovery (ORVR) for vehicles or for low emissions vehicle LEV-II refueling requirements. The vent system includes at least a first elongated member (e.g., a vent tube), a rotational coupling, and a second elongated member (e.g., a breather tube) that is coupled between the rotational coupling and a buoyant device. In some embodiments, the vent system includes a flexible sleeve coupled between the first elongated member and the rotational coupling. The buoyant device interacts with materials (e.g., fuel) input into the fuel tank to actuate rotation of the rotational coupling. Once a predetermined amount of fuel has been input into the fuel tank, the buoyant device rotates the rotational coupling a predetermined amount, which stops venting of fuel vapor through the vent system. Vapor pressure then builds in the fuel tank, which actuates an automatic shut off mechanism of a device controlling fuel input, which stops fuel flow. Through the use of the buoyant device and the rotational coupling, regardless of the incline of the fuel tank with respect to a ground plane, the passage for vapors through the vent system will be closed when the fuel has reached the predetermined level. Thus, the vent system is used to compensate for inclination of the fuel tank.

Throughout the specification, an environment is described with respect to refilling a fuel tank as a container with fuel as a material. It is to be appreciated that other environments are also contemplated within the scope of the invention, such that any container containing any material can be used. Also, although a vent system is only shown as lying along an axis of symmetry of a fuel tank, it can be positioned anywhere along a top surface of the fuel tank.

System Including a Flexible Sleeve

Figure 3:
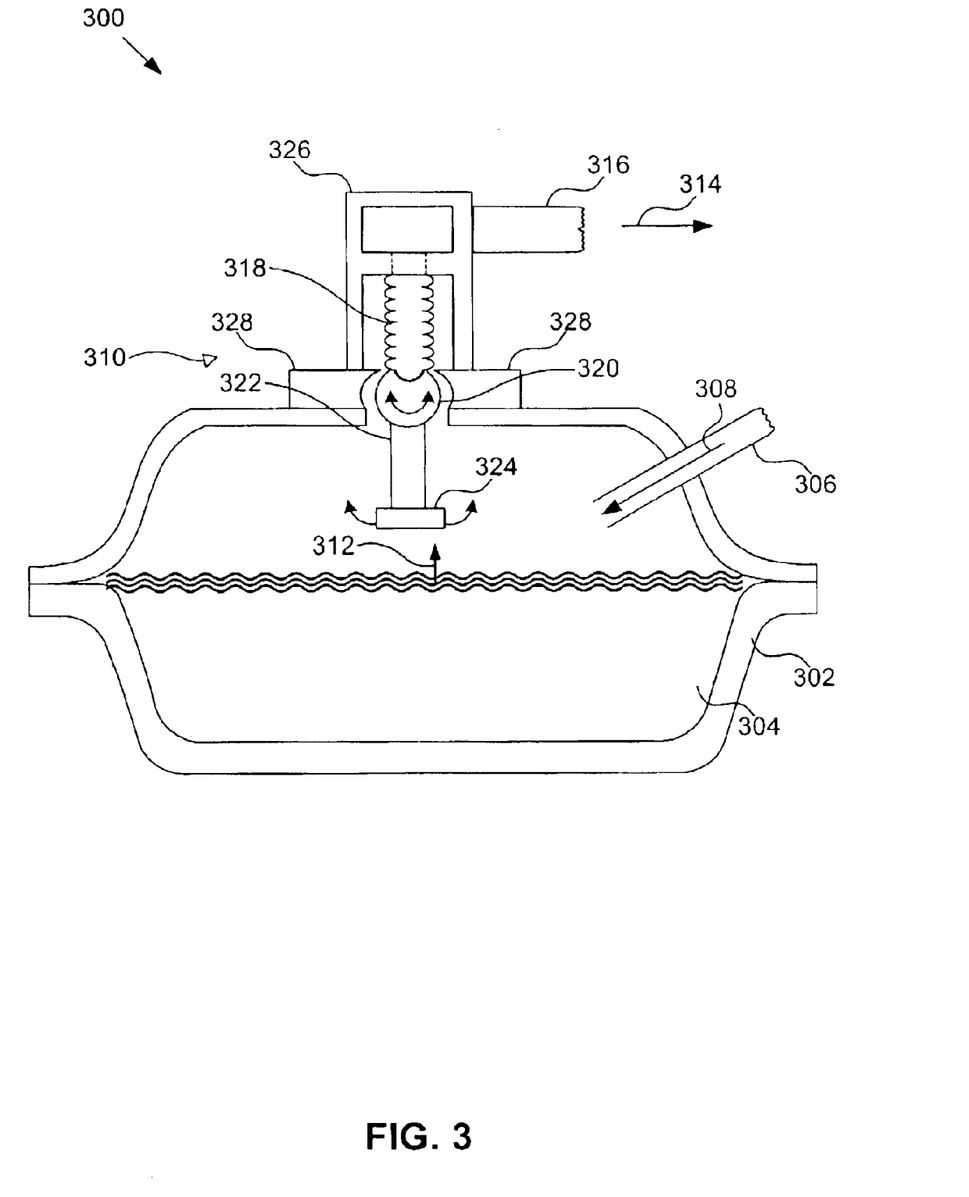
FIG. 3 shows a cross-section of a container and indicates a direction of vapor travel during refilling of the container with materials according to embodiments of the present invention.

FIG. 3 shows a cross-section of a system 300 according to embodiments of the present invention. In this figure, system 300 is in a refilling state. System 300 includes a container (e.g., a fuel tank) 302 that holds materials (e.g., a fuel, such as gasoline, jet fuel, kerosene, diesel fuel, or some other fuel) 304 input through an opening (e.g., a filler pipe) 306. A direction of flow for fuel input is shown as arrow 308. The flow can be controlled by a flow control device (i.e., a pressure sensitive nozzle) (not shown) that is coupled to a supply (not shown) of fuel 304. Fuel vapors released by fuel 304 can escape fuel tank 302 through vent system 310 in the direction of arrows 312 and 314. In some embodiments, system 300 can be a fuel tank 302 having associated fuel inlet (e.g., a filler neck and filler pipe, or the like) 306 and an articulated fuel container vent system 310 in a vehicle (not shown) that allows for ORVR or for low emissions vehicles (e.g., LEV-II) refueling requirements.

With continuing reference to FIG. 3, vent system 310 includes a first elongated device (e.g., a vent tube) 316 coupled to a first end of a flexible, deformable, or bendable sleeve 318 (hereinafter, all are referred to as "flexible"). In some embodiments, flexible sleeve 318 is made from a rubber material, a plastic material, a mesh material, or the like. A rotating device (e.g., rotational coupling, a circular joint, a spherical joint, a universal joint, or the like) 320 is coupled at a first end to a second end of flexible sleeve 318. A second elongated device (e.g., a breather tube) 322 is coupled at a first end to a second end of rotating device 320 and at a second end to a buoyant device (e.g., an annular or toriodal float) 324, described in more detail below with respect to FIG. 8. A first support member 326 is coupled to a second support member 328. Together, support members 326 and 328 secure vent system 310 to fuel tank 102. As can been seen in FIGS. 3–5, a small gap between rotating device 320 and second support member 328 can be used to prevent leakage, to permit freedom of movement of rotating device 320, or for other reasons.

Although not explicitly shown in the figures, fuel vapors pass through an elongated opening, bore, or lumen (hereinafter, all are referred to as "lumen") running end to end through each device 316, 318, 320, 322, and 324. Fuel vapor travel starts at buoyant device 324, an continues through breather tube 322, rotating device 320, flexible sleeve 318, and finally out vent tube 316. The lumen running through devices 316, 318, 320, 322, and 324 is known in the art, and can run through any section of the devices. In preferred embodiments, the lumen will run along a longitudinal axis of symmetry of the devices.

Figure 4:
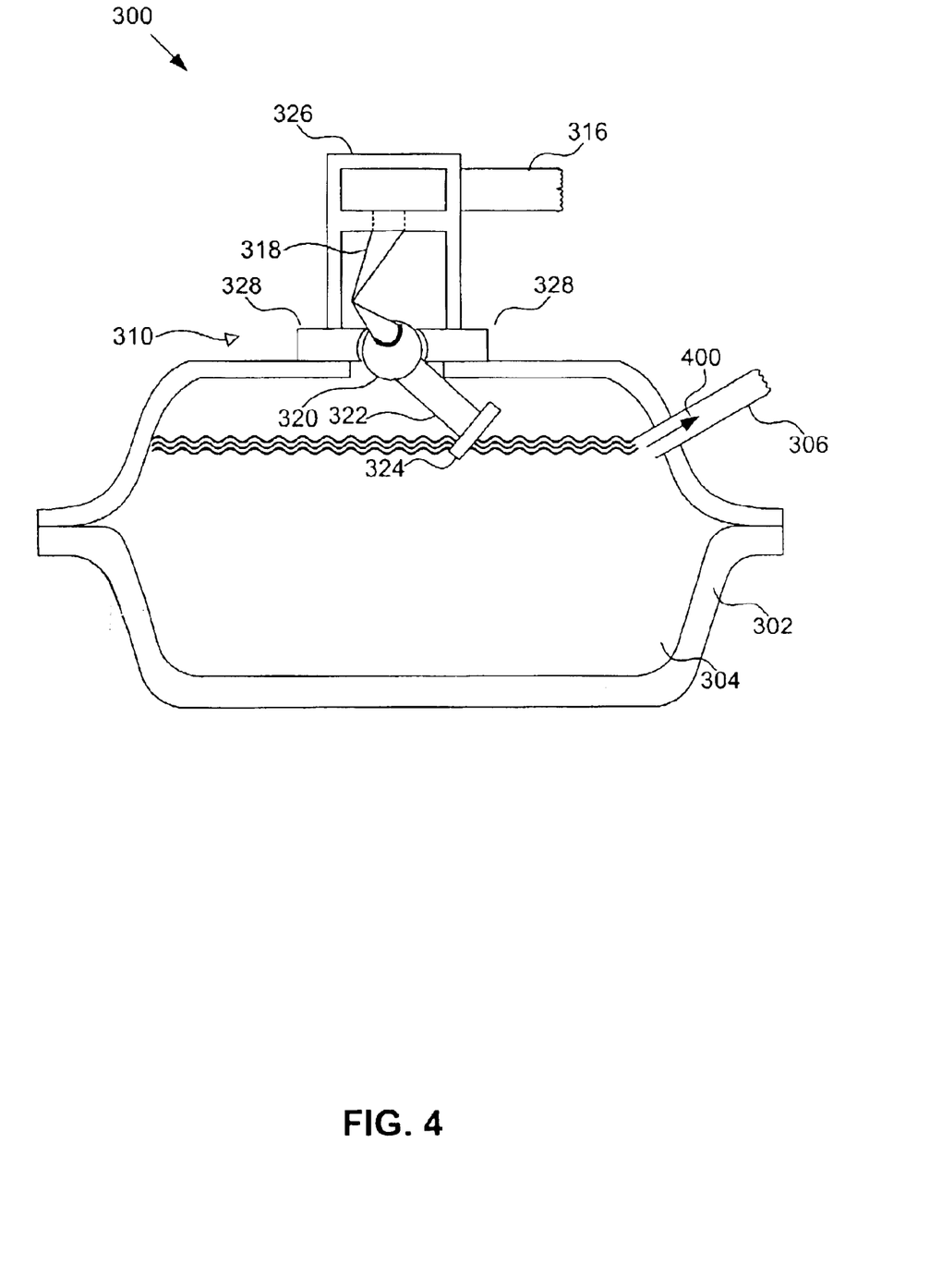
FIG. 4 shows a cross-section of a container and indicates a direction of vapor travel after the materials have reached a predetermined level in the container according to embodiments of the present invention.

FIG. 4 shows a cross sectional view of fuel tank 302 after fuel 304 has reached a predetermined level (e.g., 95% of container capacity for some embodiments relating to refueling of fuel tanks on vehicles) according to embodiments of the present invention. Rising fuel 304 interacts with buoyant device 324 to cause rotation of rotating device 320. Although shown rotating from left to right in this figure, an actual direction of rotation can vary based on direction of view of fuel tank 302, or other factors. This direction is only used for explanation. As rotating device 320 rotates, flexible sleeve 318 starts to "bend" or "flex" (hereinafter, both are referred to as "bend").

Once a predetermined point is reached, i.e., when the lumen running through flexible sleeve 318 is pinched-off, rotating device 320 stops rotating. In some embodiments, a rotation angle or length of travel for rotating device 320 can be based on a length and/or an elasticity of flexible sleeve 318. In operation, rotating device 320 rotates from when fuel 304 starts interacting with buoyant device 324 until at least a point where the lumen in flexible sleeve 318 is pinched-off. In another embodiment, the rotating can end when buoyant device 324 locks, which may be against an inside surface of a top portion of tank 302. In either embodiment, once rotation has stopped, vapor flow through vent system 310 is stopped. This causes fuel 304 to fill up filler pipe 306, which can be used to trigger an auto-shutoff mechanism in a control device (e.g., a vapor sensitive nozzle) (not shown) that controls the flow of fuel 304.

Figure 5:
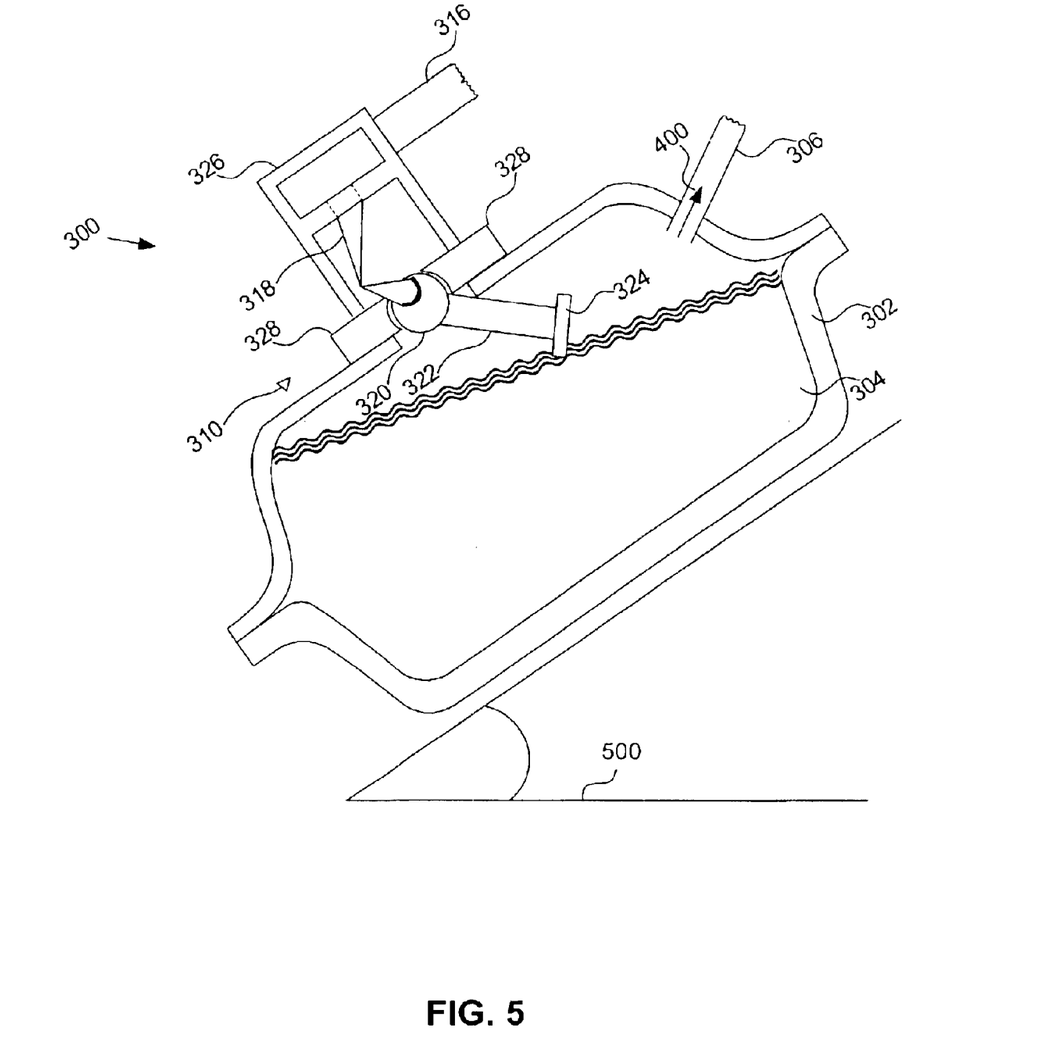
FIG. 5 show a cross-section of a container that is inclined with respect to a ground plane and indicates a direction of vapor travel after materials have reached a predetermined level in the container according to embodiments of the present invention.

FIG. 5 shows a cross-section of system 300 positioned at an incline with respect to ground plane 500. Ground plane 500 is being used for explanation, but system 300 could be at an incline with respect to other planes. To overcome the problems described with respect to the conventional system 100 when a fuel tank 102 is inclined, vent system 310 replaces breather tube 114. Even at a steep incline, vent system 310 closes a vapor escape route (e.g., the lumen running through flexible sleeve 318 is pinched-off), which cuts off the vapor release through vent system 310. The buoyant device 324 interacting with fuel 304 as the fuel level rises in fuel tank 302 causes rotation of rotating device 320 to actuate closure of the vapor escape route through vent system 310. Thus, vent system 310 functions at any incline of fuel tank 302 that also causes a top surface of fuel 304 to incline. Accordingly, the arrangement of vent system 310 ensures that when fuel level has risen to a predetermined cutoff level, regardless of an incline of the top surface of fuel 304, vapor pressure can only escape through first opening 306 in the direction of arrow 500. Therefore, an auto-shutoff mechanism will always be triggered, stopping fuel flow.

Systems Not Including a Flexible Sleeve

Figure 6:
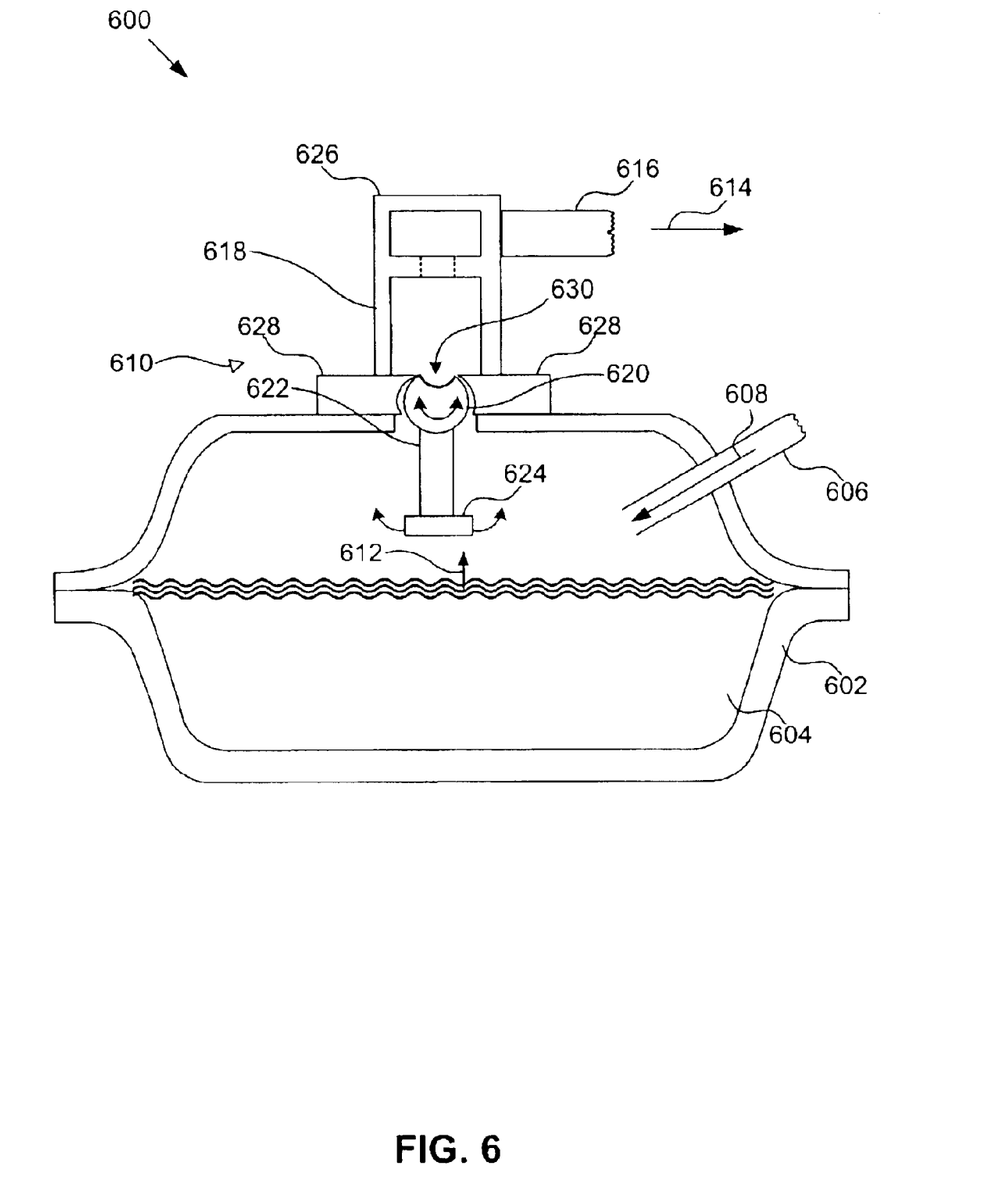
FIG. 6 shows a cross-section of a container and indicates a direction of vapor travel during refilling of the container with materials according to embodiments of the present invention.

FIG. 6 shows a cross-section of a system 600 according to embodiments of the present invention. In this figure, system 600 is in a refilling state. System 600 includes a container (e.g., a fuel tank) 602 that holds materials (e.g., a fuel, such as gasoline, jet fuel, kerosene, diesel fuel, or some other fuel) 604 input through an opening (e.g., a filler pipe) 606. A direction of flow for fuel input is shown as arrow 608. The flow can be controlled by a flow control device (i.e., a pressure sensitive nozzle) (not shown) that is coupled to a supply (not shown) of fuel 604. Fuel vapors released by fuel 604 can escape fuel tank 602 through vent system 610 in the direction of arrows 612 and 614. In some embodiments, system 600 can be a fuel tank 602 having associated fuel inlet (e.g., a filler neck and filler pipe, or the like) 606 and an articulated fuel container vent system 610 in a vehicle (not shown) that allows for ORVR or for low emissions vehicles (e.g., LEV-II) refueling requirements.

With continuing reference to FIG. 6, vent system 610 includes a first elongated device (e.g., a vent tube) 616 coupled to a support structure 618. A rotating device (e.g., a rotational coupling, a circular joint, a spherical joint, a universal joint, or the like) 620 is coupled at a first end to support structure 618. A second elongated device (e.g., a breather tube) 622 is coupled at a first end to a second end of rotating device 620 and at a second end to a buoyant device (e.g., an annular or a toriodal float) 624, described in more detail below with respect to FIG. 8. Support structure 618 includes a first support member 626 that is coupled to a second support member 628. Together, support members 626 and 628 secure vent system 610 to fuel tank 102. As can been seen in FIGS. 6–7, there is a small gap between device 620 and second support member 628 to prevent leakage, to permit freedom of movement of rotating device 620, or for other reasons.

Although not explicitly shown in the figures, fuel vapors pass through an elongated opening, bore, or lumen (hereinafter, all are referred to as "lumen") running end to end through each device 616, 620, 622, and 624. Fuel vapor travel starts at buoyant device 624, and continues through breather tube 622, rotating device 620, support stricture 618, and finally out vent tube 616. The lumen running through devices 616, 620, 622, and 624 is known in the art, and can run through any section of the devices. In preferred embodiments, the lumen will run along a longitudinal axis of symmetry of the devices.

Figure 7:
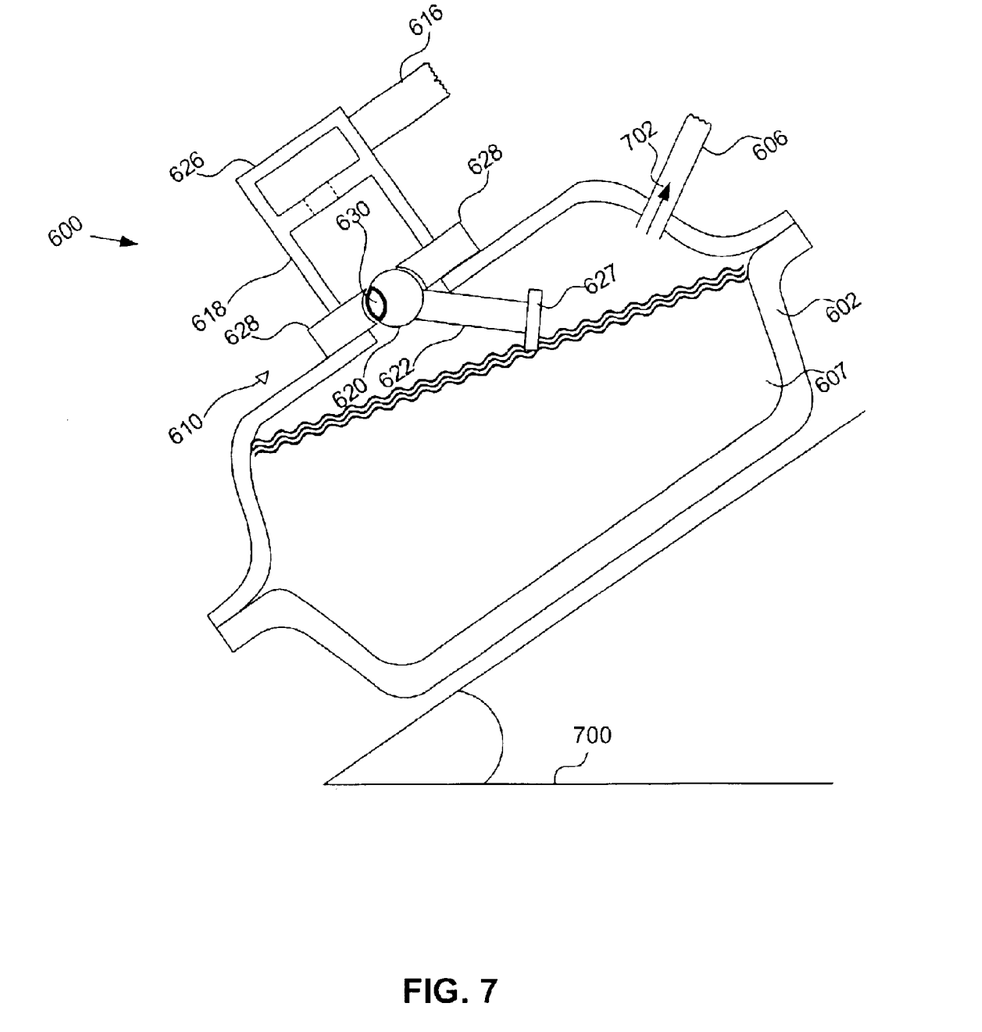
FIG. 7 show a cross-section of a container that is inclined with respect to a ground plane and indicates a direction of vapor travel after materials have reached a predetermined level in the container according to embodiments of the present invention.

FIG. 7 shows a cross sectional view of fuel tank 602 at an incline with respect to ground plane 700 (ground plane 700 is being used for explanation, but system 600 could be at an incline with respect to other planes) after fuel 604 has reached a predetermined level (e.g., 95% of container capacity for some embodiments relating to refueling of fuel tanks on vehicles) according to embodiments of the present invention. Rising fuel 604 interacts with buoyant device 624 to actuate rotation of rotating device 620. Although shown rotating from left to right in this figure, an actual direction of rotation can vary based on direction of view of fuel tank 602, or other factors. This direction is only used for explanation. As rotating device 620 rotates and substantially locks, which may be against an inside surface of a top portion of tank 602, fuel level increases to cover a fuel tank end of breather tube 622. Once the fuel tank end of breather tube 622 is substantially covered by fuel 604, the vapor path is hydraulically sealed off from a vapor escape route through support structure 618. Once a predetermined point is reached, i.e., when opening 630 is sealed off from the vapor escape route through support structure 618, rotating device 620 stops rotating. In operation, rotating device 620 rotates from when fuel 604 starts interacting with buoyant device 624 until opening 627 is completely sealed off from the vapor escape route through support structure 618. The sealing off stops vapor flow through vent system 610. This causes fuel 604 to fill up fuel inlet 606, which can be used to trigger an auto-shutoff mechanism in a control device (e.g., a vapor sensitive nozzle) (not shown) that controls the flow of fuel 604.

To overcome the problems described with respect to the conventional system 100 when a fuel tank 102 is inclined, vent system 610 replaces breather tube 114. Even at a steep incline, vent system 610 closes a vapor escape route, which cuts off the vapor release through vent system 610. The buoyant device 624 interacting with fuel 604 as fuel level rises in fuel tank 602 causes rotation of rotating device 620 to actuate closure of the vapor escape route through vent system 610. Thus, vent system 610 functions at any incline of fuel tank 602 that also causes a top surface of fuel 604 to incline. Accordingly, the arrangement of vent system 610 ensures that when fuel level has risen to a predetermined cutoff level, regardless of an incline of the top surface of fuel 604, vapor pressure can only escape through first opening 606 in the direction of arrow 702. Therefore, an auto-shutoff mechanism will always be triggered, stopping fuel flow.

Figure 8:
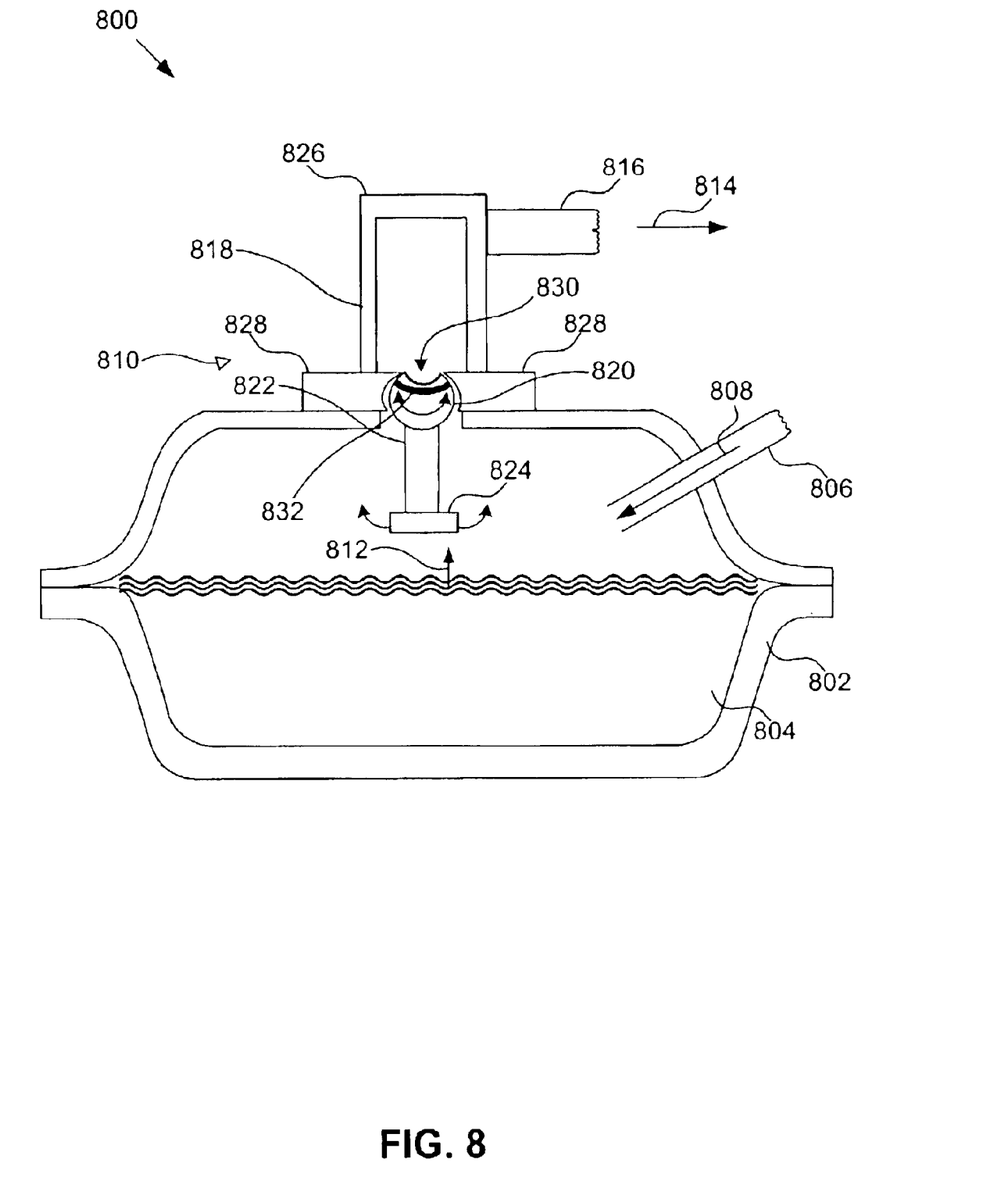
FIG. 8 shows a cross-section of a container and indicates a direction of vapor travel during refilling of the container with materials according to embodiments of the present invention.

FIG. 8 shows a cross-section of a system 800 according to embodiments of the present invention. In this figure, system 800 is in a refilling state. System 800 includes a container (e.g., a fuel tank) 802 that holds materials (e.g., a fuel, such as gasoline, jet fuel, kerosene, diesel fuel, or some other fuel) 804 input through an opening (e.g., a filler pipe) 806. A direction of flow for fuel input is shown as arrow 808. The flow can be controlled by a flow control device (i.e., a pressure sensitive nozzle) (not shown) that is coupled to a supply (not shown) of fuel 804. Fuel vapors released by fuel 804 can escape fuel tank 802 through vent system 810 in the direction of arrows 812 and 814. In some embodiments, system 800 can be a fuel tank 802 having associated fuel inlet (e.g., a filler neck and filler pipe, or the like) 806 and an articulated fuel container vent system 810 in a vehicle (not shown) that allows for ORVR or for low emissions vehicles (e.g., LEV-II) refueling requirements.

With continuing reference to FIG. 8, vent system 810 includes a first elongated device (e.g., a vent tube) 816 coupled to a support structure 818. A rotating device (e.g., a rotational coupling, a circular joint, a spherical joint, a universal joint, or the like) 820 is coupled at a first end to support structure 818. A second elongated device (e.g., a breather tube) 822 is coupled at a first end to a second end of rotating device 820 and at a second end to a buoyant device (e.g., an annular or a toriodal float) 824, described in more detail below with respect to FIG. 8. Support structure 818 includes a first support member 826 that is coupled to a second support member 828. Together, support members 826 and 828 secure vent system 810 to fuel tank 102. As can been seen in FIGS. 8–9, there is a small gap between rotating device 820 and second support member 828 to prevent leakage, to permit freedom of movement of rotating device 820, or for other reasons. A sealing device (e.g., an o-ring) 832 is coupled to the rotating device 820 to achieve sealing. In some embodiments, o-ring 832 can be made from a rubber material, a plastic material, or the like.

Although not explicitly shown in the figures, fuel vapors pass through an elongated opening, bore, or lumen (hereinafter, all are referred to as "lumen") running end to end through each device 816, 820, 822, and 824. Fuel vapor travel starts at buoyant device 824, and continues through breather tube 822, rotating device 820, o-ring 832, support structure 818, and finally out vent tube 816. The lumen running through devices 816, 820, 822, and 824 is known in the art, and can run through any section of the devices. In preferred embodiments, the lumen will run along a longitudinal axis of symmetry of the devices.

Figure 9:
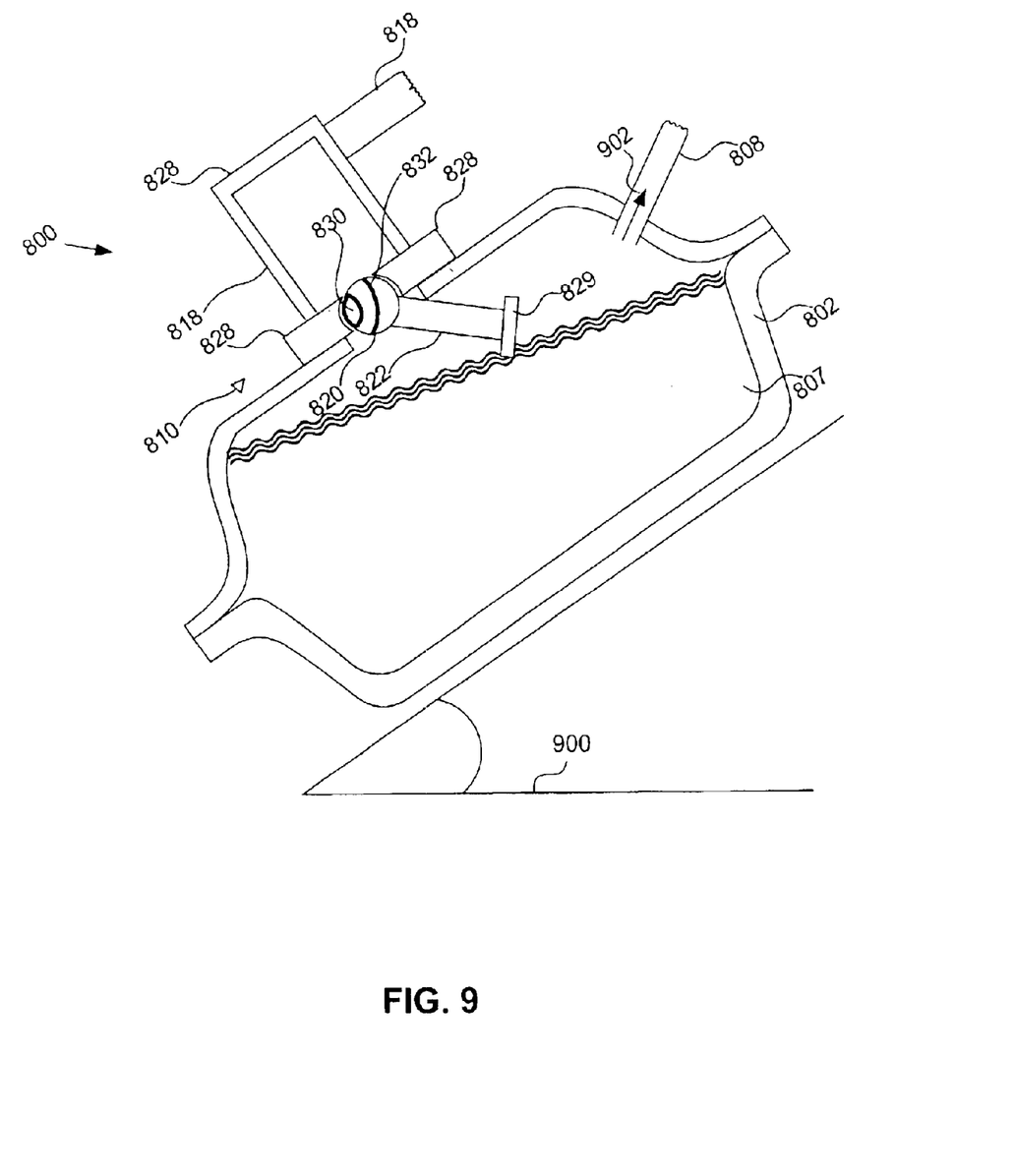
FIG. 9 shows a cross-section of a container that is inclined with respect to a ground plane and indicates a direction of vapor travel after materials have reached a predetermined level in the container according to embodiments of the present invention.

FIG. 9 shows a cross sectional view of fuel tank 802 at an incline with respect to ground plane 900 (ground plane 900 is being used for explanation, but system 800 could be at an incline with respect to other planes) after fuel 804 has reached a predetermined level (e.g., 95% of container capacity for some embodiments relating to refueling of fuel tanks on vehicles) according to embodiments of the present invention. Rising fuel 804 interacts with buoyant device 824 to actuate rotation of rotating device 820. Although shown rotating from left to right in this figure, an actual direction of rotation can vary based on direction of view of fuel tank 802, or other factors. This direction is only used for explanation. As rotating device 820 rotates, an opening 830 becomes sealed off via o-ring 832 from a vapor escape route through support structure 818. Once a predetermined point is reached, i.e., when tube 822 within tank 802 is shut-off, rotating device 820 stops rotating. In some embodiments, a rotation angle or length of travel for rotating device 820 can be based on o-ring 832. In operation, rotating device 820 rotates from when fuel 804 starts interacting with buoyant device 824 until rotating device 820 substantially locks, which can be against an inside surface of a top portion of tank 802. This causes fuel level to increase until it covers a fuel tank end of tube 822. Then, a vapor path becomes substantially hydraulically sealed off from the vapor escape route using o-ring 832. The sealing off stops vapor flow through vent system 810. This causes fuel 804 to fill up fuel inlet 806, which can be used to trigger an auto-shutoff mechanism in a control device (e.g., a vapor sensitive nozzle) (not shown) that controls the flow of fuel 804.

To overcome the problems described with respect to the conventional system 100 when a fuel tank 102 is inclined, vent system 810 replaces breather tube 114. Even at a steep incline, vent system 810 closes a vapor escape route, which cuts off the vapor release through vent system 810. The buoyant device 824 interacting with fuel 804 as fuel level rises in fuel tank 802 causes rotation of rotating device 820 to actuate closure of the vapor escape route through vent system 810. Thus, vent system 810 functions at any incline of fuel tank 802 that also causes a top surface of fuel 804 to incline. Accordingly, the arrangement of vent system 810 ensures that when fuel level has risen to a predetermined cutoff level, regardless of an incline of the top surface of fuel 804, vapor pressure can only escape through first opening 808 in the direction of arrow 902. Therefore, an auto-shutoff mechanism will always be triggered, stopping fuel flow.

Buoyant Device

Figure 10:
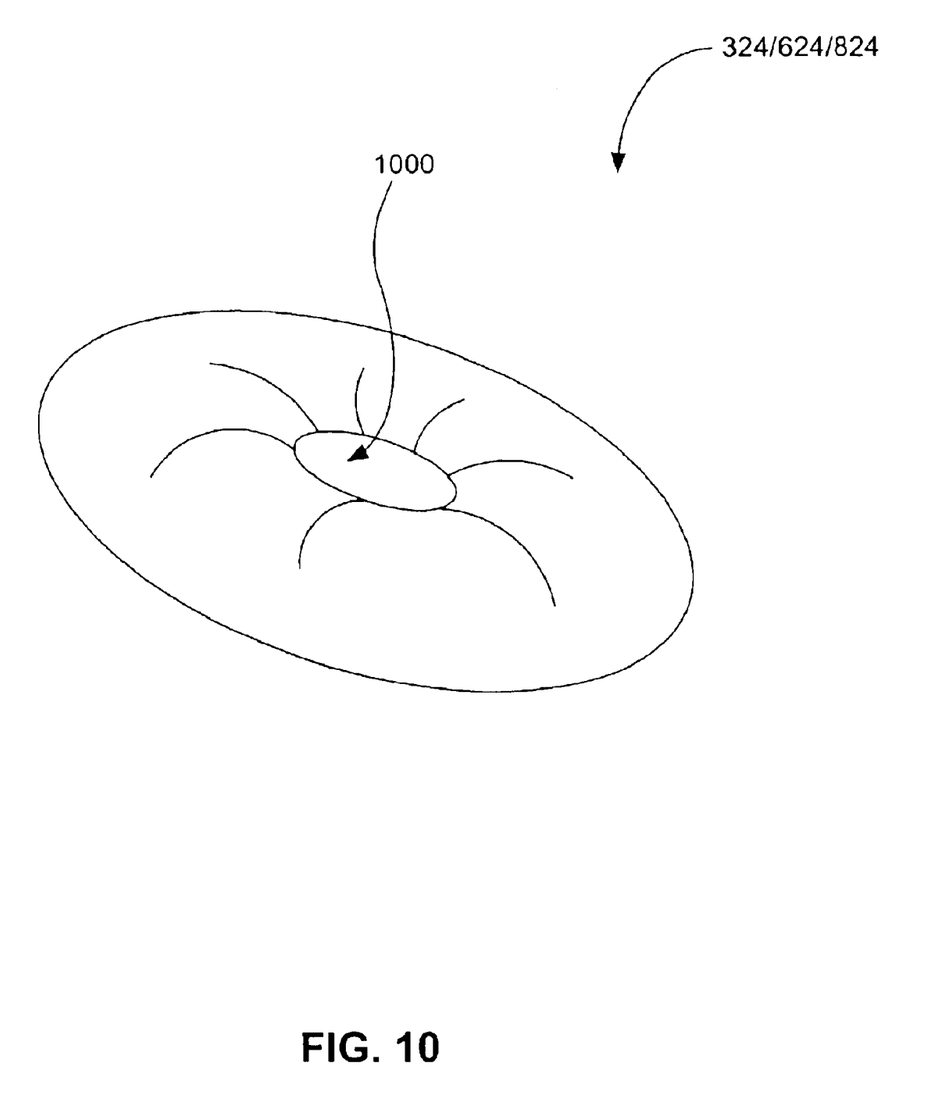
FIG. 10 shows a buoyant device having an annular or toroidal shape according to an embodiment of the present invention.

FIG. 10 shows buoyant device 324, 624 and/or 824 according to embodiments of the present invention. Buoyant device 324, 624, and/or 824 can include or be constructed of a weighted, fuel resistant material (e.g., plastic, rubber, or the like) to bring it to rest along an axis of symmetry of vent system 310, 610 and/or 810 (i.e., through a pendulum type action, and for other reasons known in the art). This material preferable has a density less than that of the fuel 304, 604, and/or 804 in the fuel tank 302, 602, and/or 802. In the embodiment shown, buoyant device 324, 624, and/or 824 has a toroidal or annular shape, although other shapes can be used. With this shape, vapors escape through opening 1000.

Methodology

Figure 11:
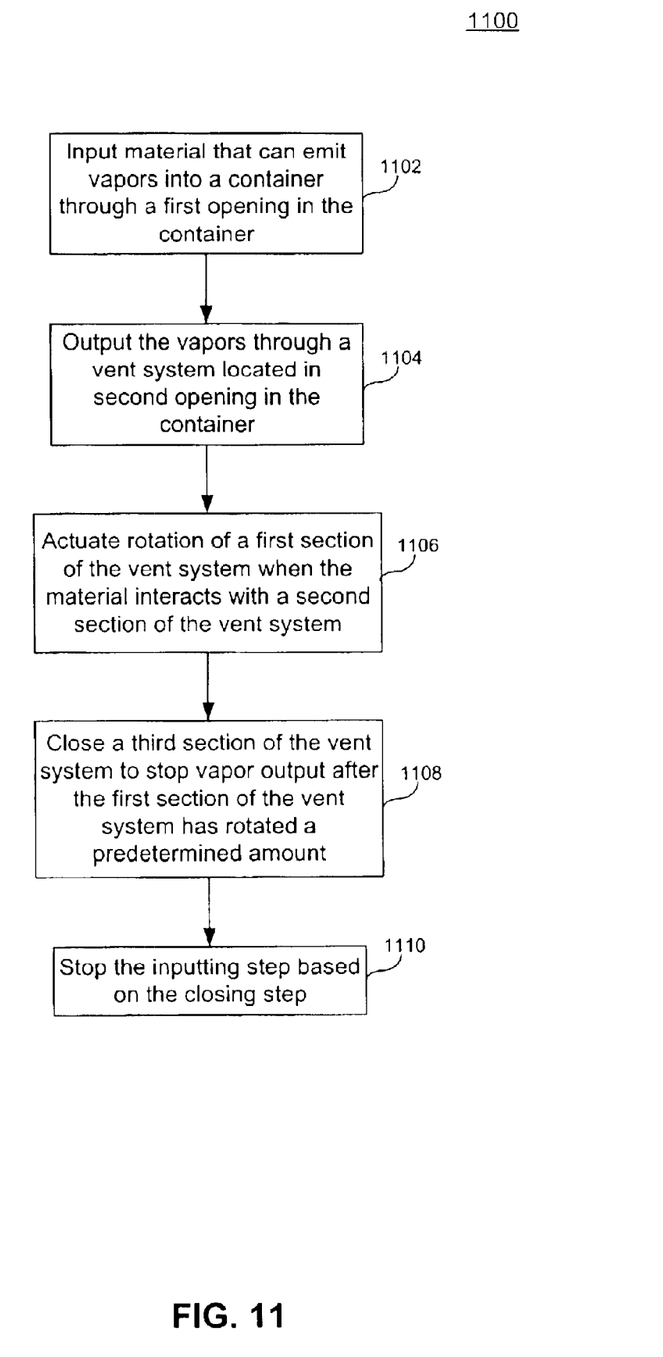
FIG. 11 shows a flow chart depicting a method for determining when material has reached a predetermined level in a container according to embodiments of the present invention.

FIG. 11 shows a flow chart depicting a method 1100 according to embodiments of the present invention. At step

1102, vapor-emitting fuel is input into the fuel tank through a first opening in the fuel tank. At step 1104, the vapors are output through a vent system located at a second opening in the container. At step 1106, a first section of the vent system is rotated when the fuel interacts with a second section of the vent system. At step 1108, a third section of the vent system is closed in response to a rotation of the first section to stop vapor output after the first section of the vent system has rotated a predetermined amount. At step 1110, the inputting step is stopped based on the closing step.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A fuel tank system, comprising:
   a container having a filler opening and a vent opening; and
   a vent coupled to said vent opening for venting fuel vapors from said container until a fuel level in said container reaches a predetermined level, wherein said vent comprises,
   a hollow vent tube,
   a flexible sleeve coupled to said vent tube, said flexible sleeve having a hollow lumen in communication with said hollow vent tube,
   a float, and
   a rotational coupling joining said float to said flexible sleeve, wherein rotation of said rotational coupling is based on interaction of said float with fuel in said container and wherein the rotation causes bending of said flexible sleeve, which at the predetermined level closes said lumen to stop the venting of the fuel vapors.

2. The system of claim 1, wherein said rotational coupling is a substantially circular device.

3. The system of claim 1, wherein said rotational coupling is a substantially circular joint.

4. The system of claim 1, wherein said rotational coupling is a spherical joint.

5. The system of claim 1, wherein said float is a weighted float.

6. The system of claim 1, wherein said float has a toroidal shape.

7. The system of claim 1, wherein said float is an weighted annular float.

8. The system of claim 1, wherein at least one of a length and an elasticity of said flexible sleeve limit rotation of said rotational coupling.

9. A fuel tank system, comprising:
   a container having a filler opening and a vent opening;
   a vent coupled to said vent opening for venting fuel vapors from said container until a fuel level in said container reaches a predetermined level wherein said vent comprises,
   a hollow vent tube;
   a float; and
   a rotational coupling having an opening communicating with said hollow vent tube, wherein rotation of said rotational coupling is based on interaction of said float with fuel in said container and wherein the rotation causes the opening to be sealed off from a vapor escape route through the vent, which closes passage of the fuel vapors through said rotational coupling at the predetermined level to stop the venting of the fuel vapors.

10. The system of claim 9, wherein said rotational coupling is a substantially circular device.

11. The system of claim 9, wherein said rotational coupling is a substantially circular joint.

12. The system of claim 9, wherein said rotational coupling is a spherical joint.

13. The system of claim 9, wherein said float is a weighted float.

14. The system of claim 9, wherein said float has a toroidal shape.

15. The system of claim 9, wherein said float is an weighted annular float.

16. A fuel tank vent system for use with a fuel tank, comprising:
    a vent for allowing escape of fuel vapors; and
    means for preventing escape of fuel vapors through said vent when a fuel level in the fuel tank reaches a predetermined level, wherein said means for preventing escape comprises,
    a flexible sleeve coupled to said vent, said flexible sleeve having a hollow lumen in communication with said vent,
    a float, and
    a rotational coupling joining said float to said flexible sleeve, wherein rotation of said rotational coupling caused by movement of said float causes bending of said flexible sleeve, which closes the lumen when the fuel level reaches the predetermined level.

17. A method comprising the steps of:
    inputting material that emits vapors into a container through a first opening in the container;
    outputting the vapors through a vent system located in second opening in the container;
    actuating rotation of a first section of the vent system when the material interacts with a second section of the vent system;
    closing a third section of the vent system to stop vapor output after the first section of the system has rotated a predetermined amount, the predetermined amount being based on an elasticity of the third section; and
    stopping said inputting step based on said closing step.

18. The method according to claim 17, wherein said closing step occurs regardless of what angle the container is with respect to a first plane based on the material interacting with the second section of the vent system to cause said actuating rotation step.

19. The method of claim 17, further comprising a step of basing the predetermined amount on a length and the elasticity of the third section of the vent system.

20. A system including a vent system that allows for automatic stopping of material from entering a container regardless of an inclination of the container with respect to a ground plane, the vent system comprising:
    a rotating device positioned in an opening of the container, said rotating device including a rotating device lumen running from a first end to a second end of said rotating device;
    a flexible sleeve coupled at a first end to said rotating device proximate a first end of the rotating device lumen and coupled at a second end to a first end of a first elongated device, the first elongated device including a first elongated device lumen running from the first end to a second end of the first elongated device;

a second elongated device coupled at a first end to a second end of said rotating device proximate a second end of the rotating device lumen, said second elongated device including a second elongated device lumen running from the first end of the second elongated device to a second end of the second elongated device; and a buoyant device coupled to the second end of said second elongated device, said buoyant device causing rotation of said rotating device when the material interacts with said buoyant device.

21. The system of claim 20, wherein the material comprises fuel that is input into said container through a second opening and wherein said lumens allow vapors to escape from said container until said buoyant device rotates said rotating device a predetermined distance based on a level of the fuel.

22. The system of claim 21, wherein said rotating device is a substantially circular device.

23. The system of claim 20, wherein said rotating device is a substantially circular joint.

24. The system of claim 20, wherein said rotating device is a spherical joint.

25. The system of claim 20, wherein said first elongated device is tube.

26. The system of claim 20, wherein said first elongated device is a vent tube.

27. The system of claim 20, wherein said second elongated device is a tube.

28. The system of claim 20, wherein said second elongated device is a breather tube.

29. The system of claim 20, wherein said buoyant device is a weighted float.

30. The system of claim 20, wherein said buoyant device has a toroidal shape.

31. The system of claim 20, wherein said buoyant device is an weighted annular float.

32. The system of claim 20, wherein a length and elasticity of said flexible sleeve limit rotation of said rotating device.

33. The system of claim 20, wherein an articulated fuel container vent (AFCV) is comprised of said rotating device, said flexible sleeve, the first elongated device, said second elongated device, and said buoyant device.

34. The system of claim 33, wherein said AFCV performs onboard refueling vapor recovery (ORVR).

35. The system of claim 34, wherein the ORVR occurs regardless of an angle with respect to ground of said container.

36. A system including a vent system that allows for automatic stopping of material from entering a container regardless of an inclination of the container with respect to a ground plane, the vent system comprising:

a support structure positioned adjacent an opening of the container;

a rotating device positioned in the support structure, said rotating device including a rotating device lumen running from a first end to a second end of said rotating device;

an elongated device coupled at a first end to the second end of said rotating device proximate an end of the rotating device lumen, said elongated device including an elongated device lumen running from the first end of said elongated device to a second end of said elongated device; and a buoyant device coupled to the second end of said elongated device, said buoyant device causing rotation of said rotating device when the material interacts with said buoyant device, such that an opening of said rotating device becomes sealed off from a vapor escape route through said support structure when said buoyant device rotates said rotating device a predetermined distance.

37. An articulated fuel tank vent used for onboard refueling vapor recovery that automatically stops fuel from entering a fuel tank regardless of an inclination of the fuel tank with respect to a ground plane, the vent comprising:

a vent tube;

a flexible sleeve coupled at a first end to said vent tube;

a rotating device coupled at a first end to a second end of said flexible sleeve;

a breather tube coupled at a first end to a second end of said rotating device; and a float coupled to a second end of said breather tube.

38. An articulated fuel tank vent used for onboard refueling vapor recovery that automatically stops fuel from entering a fuel tank regardless of an inclination of the fuel tank with respect to a ground plane, the vent comprising:

a support structure;

a vent tube coupled at an end to said support structure;

a rotating device coupled to said support structure;

a breather tube coupled at a first end to said rotating device; and a float coupled to a second end of said breather tube.

39. A fuel tank vent system for use with a fuel tank, comprising:

a vent for allowing escape of fuel vapors; and means for preventing escape of fuel vapors through said vent when a fuel level in the fuel tank reaches a predetermined level, wherein said means for preventing escape comprises,
a support structure,
a float, and
a rotational coupling having an opening, wherein rotation of said rotational coupling caused by movement of said float causes the opening to become sealed off from a vapor escape route through said support structure when the fuel level reaches the predetermined level, wherein said means for preventing escape also being used to compensate for inclinations of the fuel tank with respect to a ground plane.

40. The fuel tank system of claim 1, wherein said vent compensates for when said container is inclined with respect to a ground plane.

41. The fuel tank system of claim 9, wherein said vent compensates for when said container is inclined with respect to a ground plane.

42. The fuel tank vent system of claim 16, wherein said means for preventing escape compensates for inclinations of the fuel tank with respect to a ground plane.

* * * * *